United States Patent
Garmiza et al.

(10) Patent No.: US 10,223,000 B2
(45) Date of Patent: Mar. 5, 2019

(54) DATA COMPRESSION FOR GRID-ORIENTED STORAGE SYSTEMS

(71) Applicant: INTERNATIONAL BUSINESS MACHINES CORPORATION, Armonk, NY (US)

(72) Inventors: Ehood Garmiza, Neve Ziv (IL); Orit Nissan-Messing, Hod HaSharon (IL); Ron S. Shapiro, Tel-Aviv (IL); Lior Shlomov, Or Yehuda (IL); Assaf Yaari, Rosh-HaAyin (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/719,094

(22) Filed: May 21, 2015

(65) Prior Publication Data

US 2017/0052711 A1    Feb. 23, 2017

(51) Int. Cl.
*G06F 3/06* (2006.01)

(52) U.S. Cl.
CPC ............ *G06F 3/0611* (2013.01); *G06F 3/067* (2013.01); *G06F 3/0608* (2013.01); *G06F 3/0635* (2013.01); *G06F 3/0638* (2013.01)

(58) Field of Classification Search
CPC ...... G06F 3/0611; G06F 3/067; G06F 3/0661; G06F 3/0635
See application file for complete search history.

(56) References Cited

U.S. PATENT DOCUMENTS 7,584,226 B2 *  9/2009  Fatula, Jr. ............ G06F 11/1464
8,677,505 B2    3/2014  Redlich et al.
(Continued)

FOREIGN PATENT DOCUMENTS

| WO | 2012031269 A1 | 3/2012 |
| WO | 2012040391 A1 | 3/2012 |
| WO | 2013084267 A1 | 6/2013 |

OTHER PUBLICATIONS

Nguyen et al., "Rapid High Quality Compression of Volume Data for Visualization" pp. 49-57, Zuerst ersch. in: Computer Graphics Forum ; 20 (2001), Konstanzer Online-Publikations-System (KOPS).

(Continued)

*Primary Examiner* — Rocio Del Mar Perez-Velez
(74) *Attorney, Agent, or Firm* — Griffiths & Seaton PLLC (57) ABSTRACT

Methods, computing systems and computer program products implement embodiments of the present invention that include configuring multiple storage system resources to manage a storage entity distributed among the storage system resources. Upon receiving, by a first given storage system resource from a host computer, an I/O request for data in the storage entity, a second given storage system resource responsible for managing the storage entity data referenced in the I/O request is identified, and the I/O request is forwarded to the second given storage system resource. Upon receiving the forwarded I/O request, the second given storage system resource performs a data compression operation while processing the I/O request, and conveys a result of the I/O operation to the first given storage system resource. Upon receiving the result from the second given storage system resource, the first given storage system resource forwards the result to the host computer.

20 Claims, 4 Drawing Sheets

(56) References Cited

U.S. PATENT DOCUMENTS

| | | | |
|---|---|---|---|
| 2006/0271601 A1* | 11/2006 | Fatula, Jr. | G06F 11/1464 |
| 2007/0174192 A1 | 7/2007 | Gladwin et al. | |
| 2008/0040505 A1* | 2/2008 | Britto | G06F 3/0608 |
| | | | 709/238 |
| 2008/0183918 A1* | 7/2008 | Dhokia | G06F 12/0246 |
| | | | 710/50 |
| 2010/0023524 A1* | 1/2010 | Gladwin | G06F 3/0617 |
| | | | 707/E17.032 |
| 2013/0086336 A1* | 4/2013 | Canepa | G06F 3/0683 |
| | | | 711/154 |
| 2013/0159622 A1* | 6/2013 | Cohen | G06F 3/0683 |
| | | | 711/114 |
| 2013/0346748 A1 | 12/2013 | Orsini et al. | |
| 2014/0250271 A1* | 9/2014 | Hara | G06F 3/0632 |
| | | | 711/114 |
| 2014/0250300 A1 | 9/2014 | Runkis et al. | |
| 2015/0248292 A1* | 9/2015 | Koker | G06F 9/30043 |
| | | | 711/123 |

OTHER PUBLICATIONS

Omeltchenko et al., "Scalable I/O of large-scale molecular dynamics simulations: A data-compression algorithm", Dec. 28, 1999, pp. 78-85, Computer Physics Communications 131 (2000), Louisiana State University, Baton Rouge, LA, USA.

* cited by examiner

DATA COMPRESSION FOR GRID-ORIENTED STORAGE SYSTEMS

FIELD OF THE INVENTION

The present invention relates generally to data compression, and specifically to distributing compression of data stored in grid-oriented storage systems.

BACKGROUND

Grid-oriented storage (also known as grid storage) is a specialized approach to store data using multiple self-contained interconnected storage nodes so that any given storage node can communicate with any other storage node without the data having to pass through a centralized switch. In grid-oriented storage systems, each storage node comprises an interface node and a data node, wherein the interface node is configured to communicate with host computers and other storage nodes in the grid, and the data node is configured to manage data stored on the storage node.

Grid-oriented storage systems can implement a uniform data distribution scheme that optimizes load balancing, fault-tolerance and redundancy across the system. In operation, if one of the storage nodes fails, then network traffic can be rerouted to a redundant storage node. Additionally or alternatively, if a network path between two storage nodes is interrupted, network traffic can be rerouted via another network path.

The description above is presented as a general overview of related art in this field and should not be construed as an admission that any of the information it contains constitutes prior art against the present patent application.

SUMMARY

There is provided, in accordance with an embodiment of the present invention a method, including configuring multiple storage system resources to manage a storage entity distributed among the storage system resources, receiving, by a first given storage system resource, an input/output (I/O) request for data in the storage entity, identifying a second given storage system resource responsible for managing the storage entity data referenced in the I/O request, forwarding the I/O request to the second given storage system resource, and performing, by the second given storage system resource, a data compression operation while processing the I/O request.

There is also provided, in accordance with an embodiment of the present invention a grid-oriented storage system, including a network, multiple storage system resources coupled to the network and configured to manage a storage entity distributed among the storage system resources, wherein a first given storage system resource is configured to receive an input/output (I/O) request for data in the storage entity, to identify a second given storage system resource responsible for managing the storage entity data referenced in the I/O request, and to forward the I/O request to the second given storage system resource, and wherein the second given storage system resource is configured to perform a data compression operation while processing the I/O request.

There is further provided, in accordance with an embodiment of the present invention a computer program product, the computer program product including a non-transitory computer readable storage medium having computer readable program code embodied therewith, the computer readable program code including computer readable program code configured to arrange multiple storage system resources to manage a storage entity distributed among the storage system resources, computer readable program code executing on a first given storage system resource and configured, to receive an input/output (I/O) request for data in the storage entity, to identify a second given storage system resource responsible for managing the storage entity data referenced in the I/O request, and to forward the I/O request to the second given storage system resource, and computer readable program code executing on the second given storage system resource and configured to perform a data compression operation while processing the I/O request.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Data compression is a data reduction technique that involves encoding information using fewer bits than the original representation. In storage systems, data can be compressed before being written to the physical layer, thereby saving space and reducing the number of input/output (I/O) requests conveyed to storage system resources in the facility. Storage systems can use data compression to reduce storage space needed for operations such as snapshots, local/remote mirroring and cloning. While data compression can save a significant amount of storage space, it can consume a significant amount of processing resources, and create challenges to perform random access operations to compressed data stored in the facility's storage devices.

In storage facilities using dual node compression storage, each of the storage nodes controls a set of physical volumes, maintains its own cache, and typically compresses data prior to conveying an I/O request to the physical layer. In order to improve the response time, users can receive acknowledgements for writes when they are stored in a cache and synchronized to the cache of a peer node as well.

In grid-oriented storage systems, each user volume can be divided into small slices and distributed among the different nodes. Each compression node is then responsible for a subset of the volume's non-contiguous slices, and therefore not responsible for the entire volume. Therefore, some dual node compression properties, such as temporal locality of the data or free space management in the volume are not accessible in grid storage systems.

Embodiments of the present invention provide methods and systems for distributing real-time data compression in grid-oriented storage systems. As described hereinbelow, multiple storage system resources are configured to manage a storage entity distributed among the storage system resources. In embodiments herein, examples of storage system resources include, but are not limited to, storage area network (SAN) systems and network attached storage (NAS) systems, and examples of storage entities that can be distributed among the storage system resources include, but are not limited to, logical/physical volumes, files, blocks, chunks and objects.

Upon a first given storage system resource receiving an input/output (I/O) request for data stored in the storage entity, a second given storage system resource responsible for managing (i.e., storing) the storage entity data referenced in the I/O request is identified. For example, if the I/O request comprises a read request, the second given storage system resource comprises the storage system resource storing the data to be retrieved. Likewise, if the I/O request comprises a write request, the second given storage system resource comprises the storage system resource where the data is to be written. In some embodiments, the first and the second given storage system resources may comprise a single one of the storage system resources. For example, the first given storage system resource can receive a read request for data stored on the first given storage system resource.

Upon identifying the second given storage system resource, the first given storage system resource forwards the I/O request to the second given storage system resource, and the second given storage system resource performs a data compression operation while processing the I/O request. For example, if the I/O request comprises a request to read data, the second given storage system resource retrieves compressed data from a storage device and decompresses the compressed data. Likewise, if the I/O request comprises a request to write data, the second given storage system resource compresses the data and stores the compressed data to a storage device.

Systems implementing embodiments of the present invention can evenly distribute data compression among storage nodes, much like how data slices (described hereinbelow) are distributed between data nodes in grid-oriented storage systems. By distributing data compression operations among storage nodes, data stored on multiple storage nodes can be simultaneously compressed/decompressed by their respective storage nodes, thereby increasing performance. Additionally, grid-oriented storage systems may use less bandwidth when performing mirroring and/or data synchronization operations since compressed data is conveyed between the storage nodes.

Figure 1:
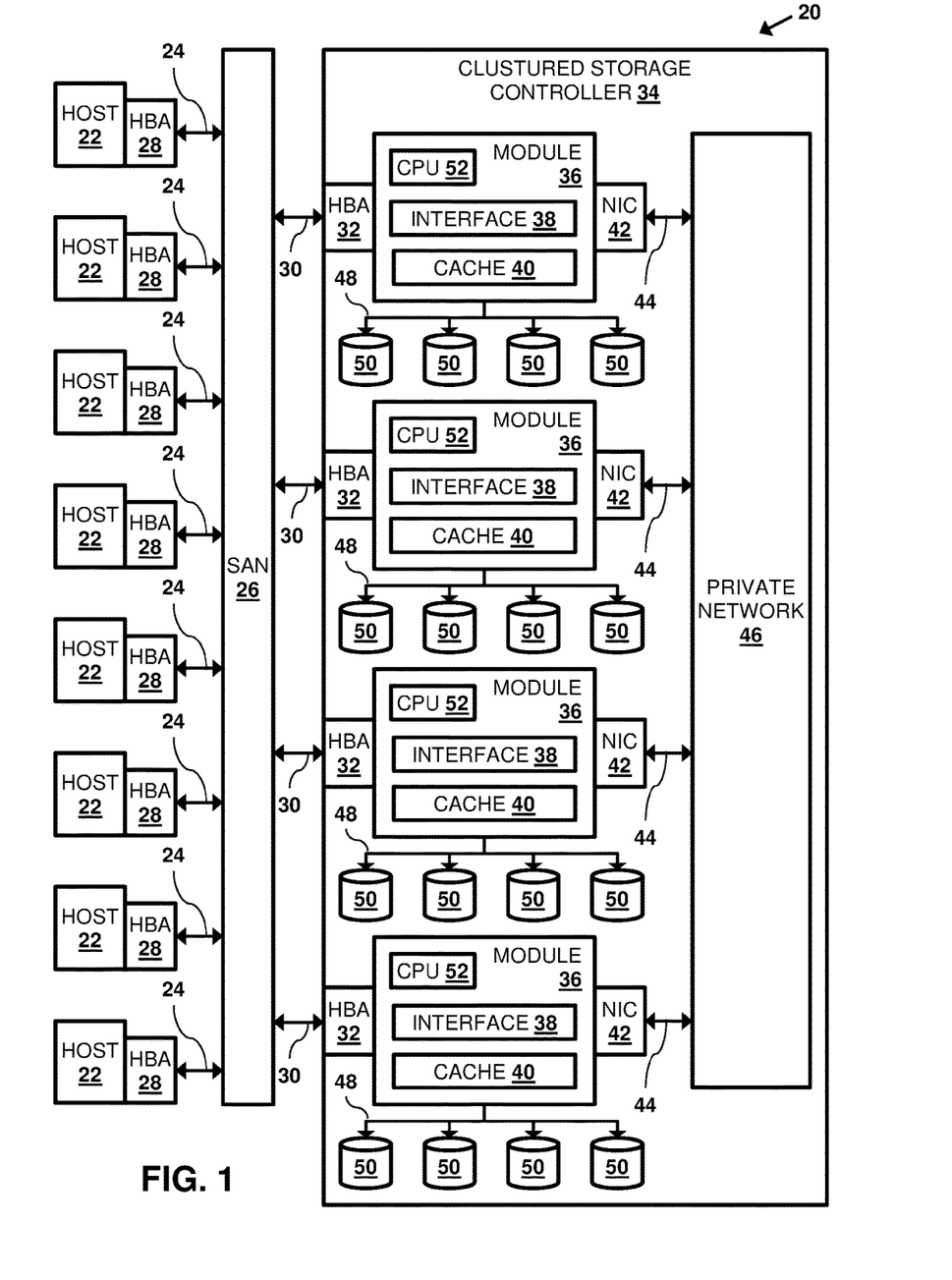
FIG. 1 is a block diagram that schematically illustrates a storage system comprising a storage controller configured as a grid-oriented storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs) or high-speed Infiniband or 10 G Ethernet network interface cards ("NIC"). Clustered storage controller 34 implements clusters of storage modules 36, each of which includes a processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Figure 2:
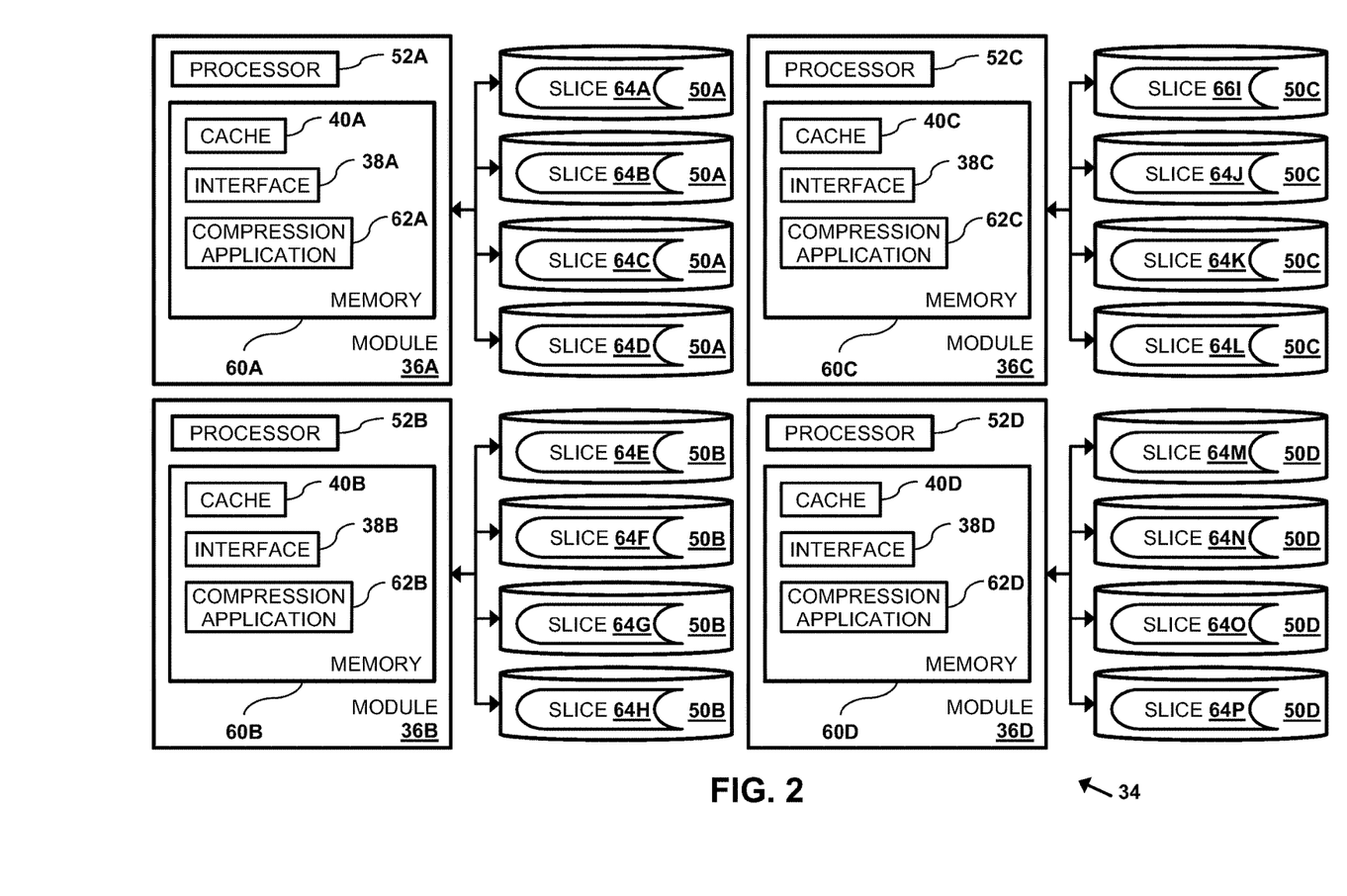
FIG. 2 is a block diagram that schematically illustrates modules of the grid-oriented storage system configured to perform local data compression on data slices distributed among the modules, in accordance with an embodiment of the present invention.
Figure 3:
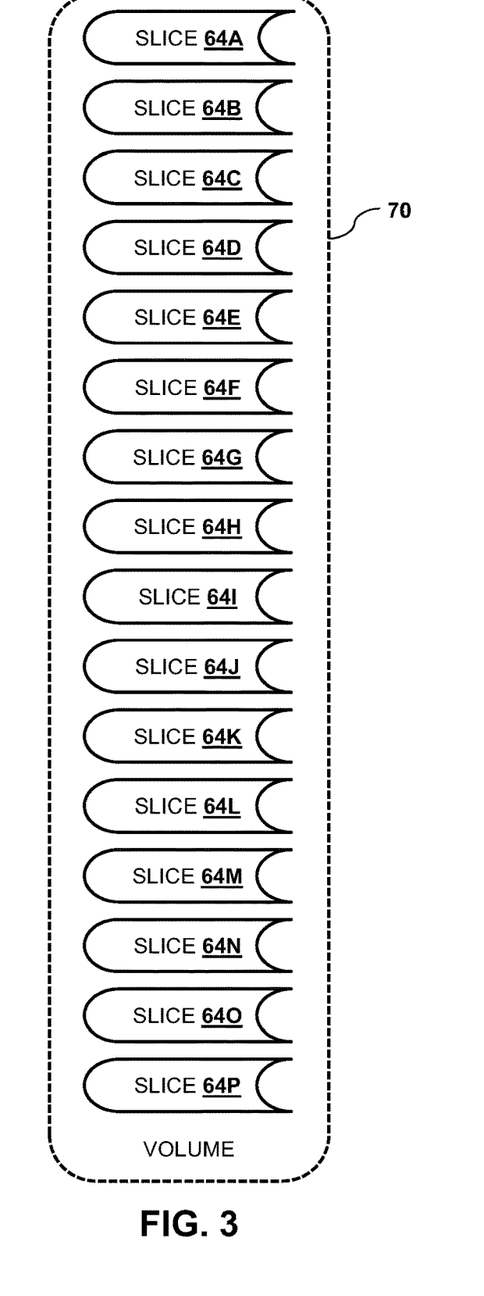
FIG. 3 is a block diagram of a logical volume comprising the data slices distributed among the modules of the grid-oriented storage system, in accordance with an embodiment of the present invention.

FIG. 2 is a block diagram that schematically illustrates components of module 36 (also referred to herein as a storage system resource), and FIG. 3 is a block diagram of a logical volume 70 (i.e., an example of a storage entity) managed by storage controller 34, in accordance with an embodiment of the present invention. In embodiments of the present invention, storage controller 34 is configured as a grid-oriented storage system, and modules 36 (and their respective components) comprise storage system resources of the grid-oriented storage system.

In FIG. 2, modules 36 and their respective components can be differentiated by appending a letter to the identifying numeral, so that the modules comprise modules 36A-36D. In addition to storage devices 50 and processor 52, module 36 comprises a memory 60 that stores cache 40, interface 38 and a compression application 62. Processor 52 executes compression application 62 to compress and decompress data, as described hereinbelow.

As shown in FIG. 3, volume 70 comprises slices 64A-64P, wherein the slices comprise a set of partitions on storage devices 50. In the example shown in FIG. 2, the slices of volume 70 are distributed among storage devices 50 so that storage devices 50A store slices 64A-64D, storage devices 50B storage slices 64E-64H, storage devices 50C storage slices 64I-64L, and storage devices 50D storage slices 64M-64P.

In some embodiments (as used by Equation 1 hereinbelow), each given slice 64 may comprise a non-contiguous range of addresses, and system 20 can use a "modulo N" calculation (i.e., "every N-th block") when storing the given slice to a given storage device 50. For example, if N=5, then slice 64A comprises blocks (i.e., storage regions on the storage devices) 1, 6, 11, 16, etc., slice 64B comprises blocks 2, 7, 12, 17, etc., slice 64C comprises blocks 3, 8, 13, 18 and so forth.

In operation, interface 38 in a first given module 36 receives an I/O request from a given host computer 22, identifies a second given module 36 that manages the slice for the data referenced in the I/O request, and conveys the I/O request to the second given module 36. Upon receiving the I/O request, compression application 62 on the second given module performs a data compression operation as part of performing the I/O operation.

In a first example, interface 38A receives, from a given host computer 22, a write request to store data to slice 64G, and forwards the write request to module 36B. Upon interface 38B receiving the write request from interface 38A, compression application 62B performs the compression operation by compressing the data, and processor 52B stores the compressed data for slice 64G. Upon storing the compressed data for slice 64G (or cache 40B), interface 38B conveys a completion indication to module 36A, and upon receiving the completion indication, interface 38A forwards the completion indication to the given host computer.

In a second example, interface 38D receives, from a given host computer 22, a read request to retrieve data from slice 64J, and forwards the read request to module 36C. Upon interface 38C receiving the read request from interface 38D, processor 52C retrieves compressed data for (i.e., associated with) slice 64J, and compression application 62C performs the compression operation by decompressing the retrieved data. Upon decompressing the retrieved data, interface 38C conveys the decompressed data to module 36D, and upon receiving the decompressed data, interface 38D forwards the decompressed data to the given host computer.

In storage controller 34, data distribution (i.e., of slices 64) and data compression are independent from one another, thereby minimizing any performance impact of data compression while maintaining load-balancing advantages of the grid-oriented storage configuration implemented by the storage controller. In embodiments of the present invention, I/O operations for compressed volumes (e.g., volume 70) pass through compression applications 62 (also referred to as a compression node), which compress and decompress the data back and forth to interfaces 38 (also referred to as the data/interface layer) based on the distribution of slices 64. In order to allow multiple compression nodes to work on a single user volume, the volume is divided into regions (e.g., slices 64). Since the system contains many regions, the compression node itself works with sections, which are aggregates of regions, wherein each section number can be calculated as:

$$\text{section\_number} = \text{region number} \ \% \ \text{number\_of\_sections} \quad (1)$$

One advantage of using sections comprises load balancing between compression nodes, since each compression node can manage several sections. Upon a given compression node or module failure, its respective sections can be redistributed and re-balanced between the remaining compression nodes. Additionally, using sections can enable modules 36 to utilize compression objects, wherein each section of a volume (which is built from many regions) comprises a separate compression object. Using sections to define compression objects can conserve the total number of compression objects required by storage controller 34.

In some embodiments, the interface layer (i.e., interface 38) can directs I/O operation requests to the appropriate compression node by looking up which section is handled by which compression node in a compression distribution table (not shown). To determine the section (i.e., compressed object) number, the following formula can be employed:

$$((\text{Logical LBA} + \text{per\_volume\_offset})/\text{region\_size}) \% \text{number\_of\_sections} \qquad (2)$$

Processor 52 comprises a general-purpose central processing unit (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Distributed Data Compression in a Grid Storage System

Figure 4:
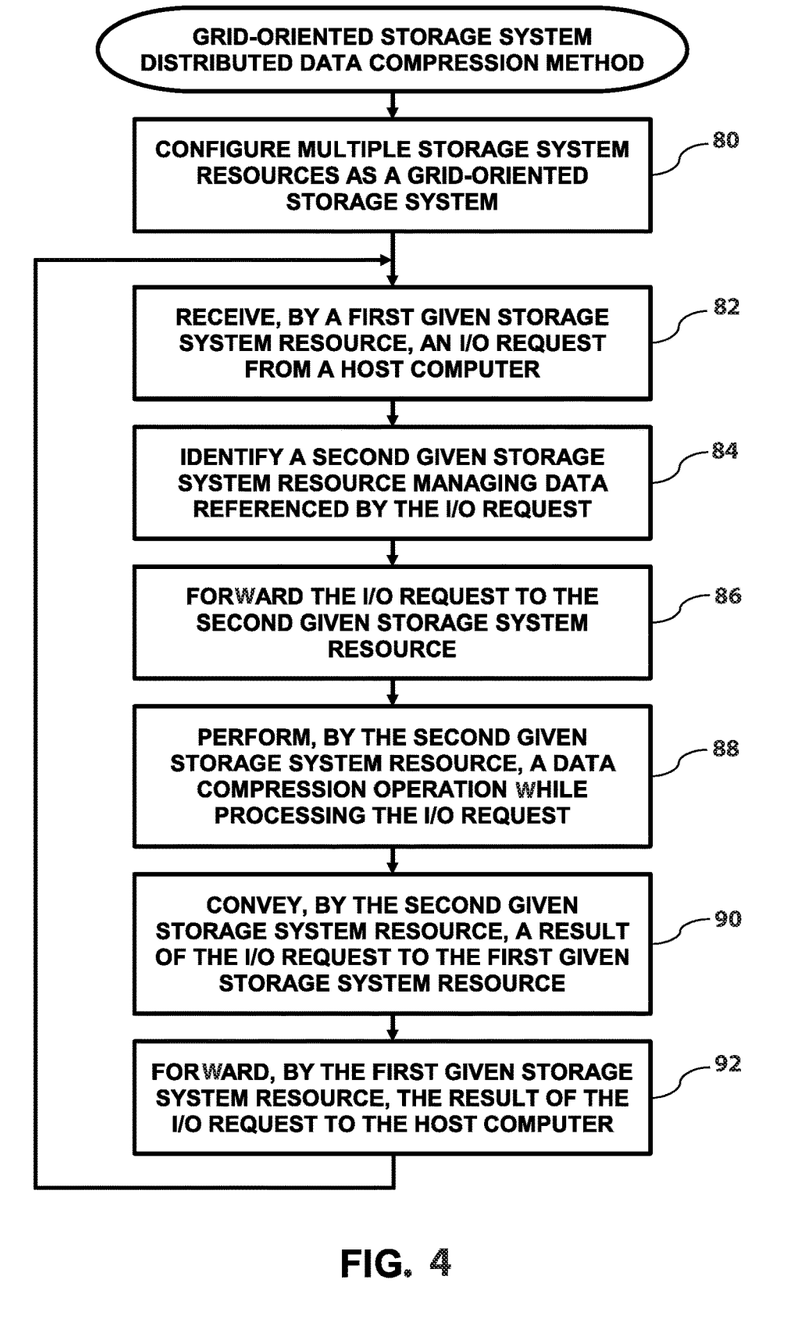
FIG. 4 is a flow diagram that schematically illustrates a method of compressing data distributed in the grid-oriented storage system, in accordance with an embodiment of the present invention.

FIG. 4 is a flow diagram that schematically illustrates a method for storage controller 34 to compress data stored in volume 70 that is distributed among slices 64, in accordance with an embodiment of the present invention. In a configuration step 80, modules 36A-36D in storage controller 34 are configured as a grid-oriented storage system, using embodiments described supra. While the example in FIGS. 2-3 shows volume 70 distributed over four modules 36 of a single storage controller 34, distributing the volume (or any other type of storage entity) over any number of modules in any number of storage controllers is considered to be within the spirit and scope of the present invention.

In a receive step 82, a first given module 36 receives an I/O request from a given host computer 22, and in an identification step 84, processor 52 in the first given module identifies a second given module 36 that manages the data referenced by the I/O request. For example if processor 52B receives a request to either read data from or write data for slice 64J, then the first given module comprises module 36B, and the second given module comprises module 36C.

In operation, the I/O request received from the given host computer comprises an address (e.g., a logical address) for the data on storage devices 50. Since system 20 stores compressed data, the actual address where the data is stored on the storage devices most likely differs from the address in the I/O request. In some embodiments, system 20 may maintain a mapping table that stores mappings between the requested addresses and the actual addresses of the compressed data. Therefore, in embodiments herein, a given processor 52 can process a write request by storing compressed data "for" a given slice, and the processor can process a read request by retrieving compressed data "for" (i.e., associated with) a given slice.

In a first forwarding step 86, the first given module forwards the I/O request to the second given module, and in a processing step 88, the second given module receives the forwarded I/O request, and performs a compression operation while processing the I/O request. As described supra, if the I/O request comprises a write request then the compression operation comprises processor 52 compressing the data prior to storing the compressed data for a given slice 64. Likewise, if the I/O request comprises a read request, then the compression operation comprises processor 52 in the second given module decompressing compressed data retrieved for (i.e., associated with) a given slice 64.

In a convey step 90, processor 52 in the second given module conveys a result of the I/O operation to the first given module. As described supra, if the I/O request comprises a write request, then the result comprises a message indicating that the write operation was completed successfully (or not completed successfully). Likewise, if the I/O request comprises a write request, then the result comprises the data that was retrieved and decompressed for a given slice 64. Finally, in a second forwarding step 92, upon receiving the result from the second given module, processor 52 in the first given module forwards the result to the given host computer that issued the I/O request, and the method continues with step 82.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
configuring multiple storage system resources to manage a storage entity distributed among the storage system resources;
receiving, by a first given storage system resource comprising a first storage node, an input/output (I/O) request for data in the storage entity from a host;
identifying a second given storage system resource comprising a second storage node responsible for managing the storage entity data referenced in the I/O request, wherein the first storage node and second storage node are among a plurality of nodes arranged in a storage grid; wherein the data in the storage entity is divided into slices and distributed among different ones of the plurality of nodes of the storage grid such that each of the plurality of nodes maintains a subset of the data's non-contiguous slices;
forwarding, from the first given storage system resource, the I/O request to the second given storage system resource; and
performing, by the second given storage system resource, a data compression operation on the storage entity data while processing the I/O request thereby completing the data compression operation by the second given storage system resource prior to conveying the storage entity data referenced in the I/O request or a completion indication of the data compression operation to the first given storage system resource.

2. The method according to claim 1, wherein configuring the multiple storage system resources to manage the storage entity comprises configuring the multiple storage system resources as a grid-oriented storage system.

3. The method according to claim 1, wherein the storage entity is selected from a group consisting of a volume, a file, a chunk, a block and an object.

4. The method according to claim 1, wherein the I/O request comprises a write request to store the data to the storage entity, and wherein performing the compression operation while processing the write request comprises compressing the data, and storing the compressed data to the storage entity.

5. The method according to claim 4, wherein receiving the I/O request comprises receiving the write request from a host computer, and further comprising conveying, by the second given storage system resource upon completing processing the write request, the completion indication to the first given storage system resource, and forwarding, by the first given storage system resource, the completion indication to the host computer.

6. The method according to claim 1, wherein the I/O request comprises a read request to retrieve the data from the storage entity, and wherein performing the compression operation while processing the read request comprises retrieving compressed data from the storage entity, and decompressing the retrieved compressed data.

7. The method according to claim 6, wherein receiving the I/O request comprises receiving the read request from a host computer, and further comprising conveying, by the second given storage system resource upon completing processing the read request, the decompressed data to the first given storage system resource, and forwarding, by the first given storage system resource, the decompressed data to the host computer.

8. A grid-oriented storage system, comprising:
a network;
multiple storage system resources coupled to the network and configured to manage a storage entity distributed among the storage system resources, wherein a first given storage system resource comprising a first storage node is configured:
to receive an input/output (I/O) request for data in the storage entity from a host,
to identify a second given storage system resource comprising a second storage node responsible for managing the storage entity data referenced in the I/O request, wherein the first storage node and second storage node are among a plurality of nodes arranged in a storage grid; wherein the data in the storage entity is divided into slices and distributed among different ones of the plurality of nodes of the storage grid such that each of the plurality of nodes maintains a subset of the data's non-contiguous slices, and
to forward, from the first given storage system resource, the I/O request to the second given storage system resource, and
wherein the second given storage system resource is configured to perform a data compression operation on the storage entity data while processing the I/O request thereby completing the data compression operation by the second given storage system resource prior to conveying the storage entity data referenced in the I/O request or a completion indication of the data compression operation to the first given storage system resource.

9. The grid-oriented storage system according to claim 8, wherein the storage entity is selected from a group consisting of a volume, a file, a chunk, a block and an object.

10. The grid-oriented storage system according to claim 8, wherein the I/O request comprises a write request to store the data to the storage entity, and wherein the second given storage system resource is configured to perform the compression operation while processing the write request by compressing the data, and storing the compressed data to the storage entity.

11. The grid-oriented storage system according to claim 10, wherein the first given storage system resource is configured to receive the I/O request by receiving the write request from a host computer, and wherein upon completing processing the write request, the second given storage system resource is configured to convey the completion indication to the first given storage system resource, and wherein the first given storage system resource is configured to forward the completion indication to the host computer.

12. The grid-oriented storage system according to claim 8, wherein the I/O request comprises a read request to retrieve the data from the storage entity, and wherein the second given storage system resource is configured perform the compression operation while processing the read request by retrieving compressed data from the storage entity, and decompressing the retrieved compressed data.

13. The grid-oriented storage system according to claim 12, wherein the first given storage system resource is configured receive the I/O request by receiving the read request from a host computer, and wherein upon completing processing the read request, the second given storage system resource is configured to convey the decompressed data to the first given storage system resource, and wherein the first given storage system resource is configured to forward the decompressed data to the host computer.

14. A computer program product, the computer program product comprising:
a non-transitory computer readable storage medium having computer readable program code embodied therewith, the computer readable program code comprising:
computer readable program code configured to arrange multiple storage system resources to manage a storage entity distributed among the storage system resources;
computer readable program code executing on a first given storage system resource comprising a first storage node and configured:
to receive an input/output (I/O) request for data in the storage entity from a host,
to identify a second given storage system resource comprising a second storage node responsible for managing the storage entity data referenced in the I/O request, wherein the first storage node and second storage node are among a plurality of nodes arranged in a storage grid; wherein the data in the storage entity is divided into slices and distributed among different ones of the plurality of nodes of the storage grid such that each of the plurality of nodes maintains a subset of the data's non-contiguous slices, and
to forward, from the first given storage system resource, the I/O request to the second given storage system resource; and
computer readable program code executing on the second given storage system resource and configured to perform a data compression operation on the storage entity data while processing the I/O request thereby completing the data compression operation by the second given storage system resource prior to conveying the storage entity data referenced in the I/O request or a completion indication of the data compression operation to the first given storage system resource.

15. The computer program product according to claim 14, wherein the computer readable program code is configured to arrange the multiple storage system resources to manage the storage entity by arranging the multiple storage system resources as a grid-oriented storage system.

16. The computer program product according to claim 14, wherein the storage entity is selected from a group consisting of a volume, a file, a chunk, a block and an object.

17. The computer program product according to claim 14, wherein the I/O request comprises a write request to store the data to the storage entity, and wherein the computer readable program code is configured to perform the compression operation while processing the write request by compressing the data, and storing the compressed data to the storage entity.

18. The computer program product according to claim 17, wherein the computer readable program code is configured to receive the I/O request by receiving the write request from a host computer, and further comprising computer readable program code executing on the second given storage entity and configured to convey, upon completing processing the write request, the completion indication to the first given storage system resource, and computer readable program code executing on the first given storage entity and configured to forward the completion indication to the host computer.

19. The computer program product according to claim 14, wherein the I/O request comprises a read request to retrieve the data from the storage entity, and wherein the computer readable program code is configured to perform the compression operation while processing the read request by retrieving compressed data from the storage entity, and decompressing the retrieved compressed data.

20. The computer program product according to claim 19, wherein the computer readable program code is configured to receiving the I/O request by receiving the read request from a host computer, and further comprising computer readable program code executing on the second given storage entity and configured to convey, upon completing processing the read request, the decompressed data to the first given storage system resource, and computer readable program code executing on the first given storage entity and configured to forward the decompressed data to the host computer.

\* \* \* \* \*